No. 805,305. PATENTED NOV. 21, 1905.
A. LIEBER.
AIR FILTER.
APPLICATION FILED NOV. 9, 1904.
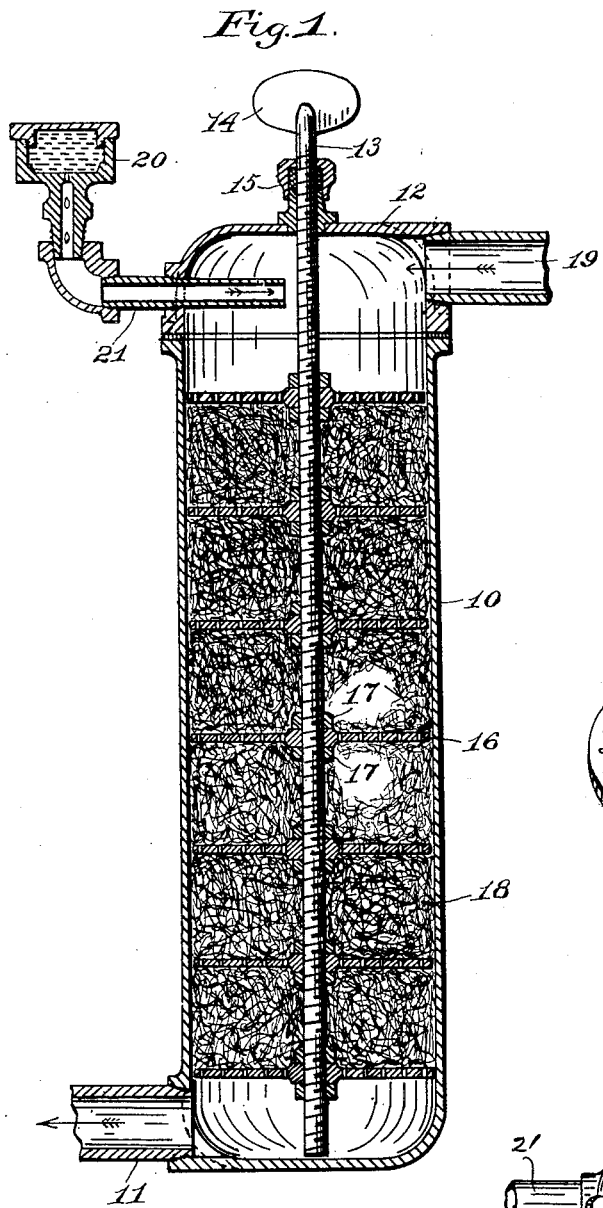
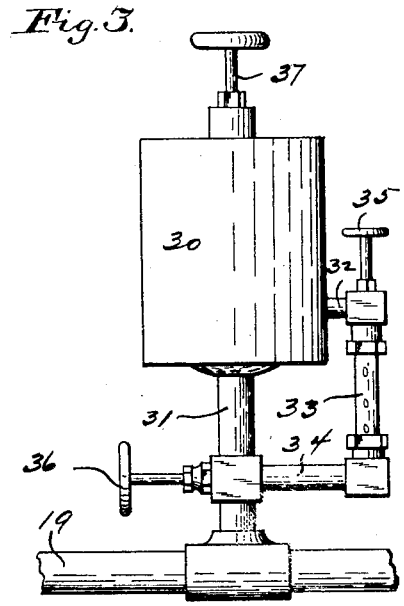
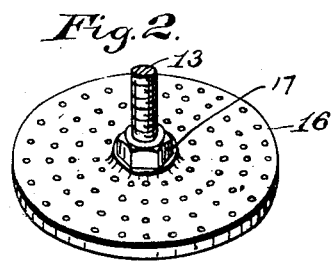
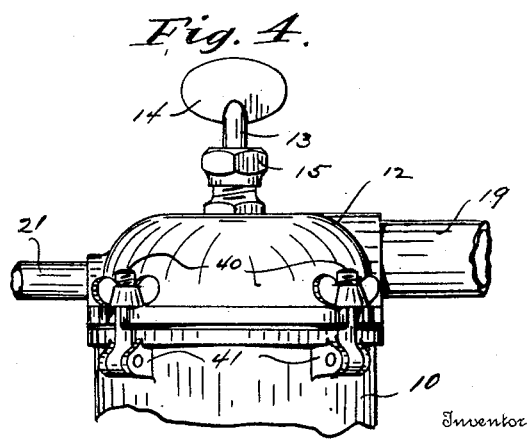
Witness
P. P. King.
Douglas Dean.
Inventor
Albert Lieber
By V. H. Lockwood
Attorney

UNITED STATES PATENT OFFICE.

ALBERT LIEBER, OF INDIANAPOLIS, INDIANA.

AIR-FILTER.

No. 805,305. Specification of Letters Patent. Patented Nov. 21, 1905.

Application filed November 9, 1904. Serial No. 232,045.

*To all whom it may concern:*

Be it known that I, ALBERT LIEBER, of Indianapolis, county of Marion, and State of Indiana, have invented a certain new and useful Air-Filter; and I do hereby declare that the following is a full, clear, and exact description thereof, reference being had to the accompanying drawings, in which like figures refer to like parts.

The object of this invention is to provide an improved construction of air-filter for filtering compressed air and removing from it impurities as well as chemically treating it during its passage through the filter.

The use to which I have put this filter is for pitching the interior of beer-kegs and the like for blowing and spreading the warm pitch upon the internal surface of a keg by compressed air passing through this filter. In such case the bacteria and germs in the air will be embedded in the pitch, and thus affect the beer, impairing its preserving qualities as well as its taste. It is therefore found very important by me that the compressed air used for the purpose mentioned be rendered chemically pure by passing the air through medicated cotton, thus arresting the particles of dust, microbes, germs, and the like. Beer-kegs treated in this way can be used immediately after being pitched and after prior use without the necessity of treating the kegs as heretofore.

The nature of the invention will be understood from the accompanying drawings and the following description and claims.

In the drawings, Figure 1 is a central longitudinal section of a filter. Fig. 2 is a perspective view of one of the filtering-disks. Fig. 3 is an elevation of a modified form of means for charging the device with chemicals. Fig. 4 is a perspective view of the top of the device shown in Fig. 1, the lower end being broken away.

In detail a suitable casing 10 is shown cylindrical in form, closed at the lower end, excepting that at that end it has an outlet 11, and open at its upper end, excepting when closed by the removable cap 12. Centrally through the disk a rod 13 extends, that is threaded throughout its length and has on its outer end a finger-piece 14 for turning the same. Suitable packing 15 makes the joint between the cap 12 and the rod 13 air-tight. Upon the rod 13 a number of perforated disks 16 are placed at suitable distances apart and held in place by a nut 17, one on each side of each disk. In this way the disks are rendered adjustable with relation to each other, and any disk may be readily replaced or the number of disks increased or diminished, as desired. The disks fit rather tightly within the cylinder 10, so that no appreciable amount of air will pass around them, but the air will pass through the perforations in the disks. Cotton 18 is packed between each pair of disks.

19 is the compressed-air inlet.

The cotton within the device is medicated from the chemical-cup 20. It has a tube 21 extending into the chamber at the upper end. The inner end of said tube protrudes for some distance into the casing, which arrangement is desirable while the device is used in its vertical position, as shown. The device may, however, be used in a horizontal position, and in such case the stem 21 need not extend farther than merely through the cap 12. The chemical-cup may be made in any desirable way so as to allow the chemicals or fluid contents to flow slowly by gravity and drip upon the upper perforated disk 16 and be blown by the incoming compressed air through the perforated disks into the cotton, and in that manner the cotton becomes saturated with the chemical, and the chemical coöperates with the cotton in catching the impurities in the air and especially in destroying the germs therein.

In the modified form of the chemical-supplying mechanism, as shown in Fig. 3, it is in connection with the compressed-air-inlet pipe, so that the passage of the air through said pipe withdraws the chemical. The receptacle for the chemical consists of a cylindrical vessel 30, carried on a post 31, that is hollow at its lower end and is mounted on the pipe 19. The passage-way for the chemical consists of a short tube 32, leading from the vessel 30 and discharging into a vertical glass tube 33, that is mounted on and discharges into a horizontal tube 34, which is connected with the post 31 and discharges into the hollow tubular lower end thereof. A valve 35 controls the passage of the fluid from the receptacle 30 into the tube 33, and the valve 36 controls its passage finally into the compressed-air pipe 19. Means 37 is provided for forcing the chemical down in the vessel 30. This is an old form of device used for lubricating purposes, and therefore a sectional view or detail showing thereof is considered unnecessary, as all skilled in the art will understand the construction.

What I claim as my invention, and desire to secure by Letters Patent, is—

1. An air-filter including a casing, an air-inlet pipe leading into one end of the casing, an air-outlet pipe leading from the other end thereof, a series of perforated partitional disks located within the casing at intervals between the inlet and outlet pipes, filtering material between said disks, and means for charging the incoming air with chemicals, substantially as set forth.

2. An air-filter including a cylindrical casing, an air-inlet pipe entering one end thereof, an air-outlet pipe leading from the other end thereof, a rod extending centrally and longitudinally through the casing that is continuously threaded, perforated disks mounted at intervals in said casing by being secured upon said rod, filtering material between said disks, and external means for turning said threaded rod.

In witness whereof I have hereunto affixed my signature in the presence of the witnesses herein named.

ALBERT LIEBER.

Witnesses:
  EVANS WOOLLEN,
  MAMIE L. BASS.